United States Patent

[11] 3,622,582

| | | |
|---|---|---|
| [72] | Inventor | Ernst Schefczik<br>Ludwigshafen, Rhine, Germany |
| [21] | Appl. No. | 731,309 |
| [22] | Filed | May 22, 1968 |
| [45] | Patented | Nov. 23, 1971 |
| [73] | Assignee | Badische Anilin- & Soda-Fabrik Aktiengesellschaft<br>Ludwigshafen, Rhine, Germany |
| [32] | Priority | May 23, 1967 |
| [33] | | Germany |
| [31] | | P 15 69 671.6 |

[54] DISPERSE QUINOPHTHALONE DYES CONTAINING A CARBOXYLIC ESTER GROUP
7 Claims, No Drawings

[52] U.S. Cl. .................................................. 260/287 R, 8/55, 260/289 QP
[51] Int. Cl. ........................................................ C07d 33/48
[50] Field of Search ........................................... 260/287, 289, 289 QP

[56] References Cited
UNITED STATES PATENTS

| | | | |
|---|---|---|---|
| 3,023,212 | 2/1962 | Richter........................ | 260/287 X |
| 3,023,213 | 2/1962 | Richter........................ | 260/287 |

FOREIGN PATENTS

| | | | |
|---|---|---|---|
| 1,091,734 | 11/1967 | Great Britain................ | 260/289 |

*Primary Examiner*—Donald G. Daus
*Attorney*—Marzall, Johnston, Cook & Root

ABSTRACT: Quinophthalone-5(6)-carboxylic ester dyes, which are particularly useful for dyeing polyester and synthetic polyamide textile material, said dyes having the formula:

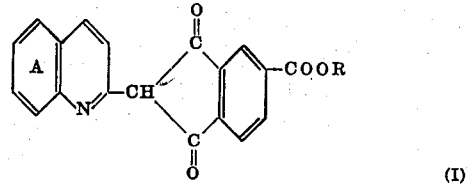

(I)

in which R denotes a linear or branched hydroxyalkyl radical having four to eight carbon atoms and in which the ring A may bear, as substituents, halogen atoms and/or alkyl groups or alkoxy groups.

DISPERSE QUINOPHTHALONE DYES CONTAINING A CARBOXYLIC ESTER GROUP

Examples of specific substituents for the ring A are chlorine atoms, bromine atoms, or methyl, ethyl, methoxy or ethoxy groups; one or more of these substituents may be present in the ring.

Industrially valuable dyes have the formula:

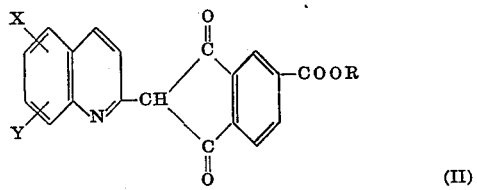

(II)

in which X and Y each denotes a hydrogen, chlorine or bromine atom or a methyl, ethyl, methoxy or ethoxy group and R denotes a linear or branched hydroxyalkyl radical having four to eight carbon atoms.

The dyes having the formula (I) may be obtained by reacting a compound having the formula (III):

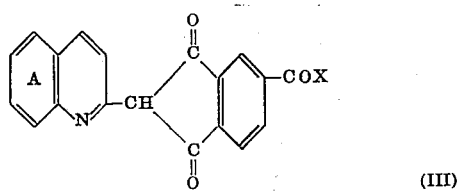

(III)

in which X denotes a chlorine or bromine atom, with a compound (glykol) having the formula (IV):

R–OH   (IV) in which R denotes a linear or branched hydroxyalkyl group with four to eight carbon atoms.

Examples of compounds having the formula (III) are quinophthalone-5(6)-carboxylic chloride or bromide, 6'-methylquinophthalone-5(6)-carboxylic chloride, 6'-chloroquinophthalone-5(6)-carboxylic chloride, 6'-methoxyquinophthalone-5(6)-carboxylic chloride, 8'-ethylquinophthalone-5(6)-carboxylic chloride or 8'-chloroquinophthalone-5(6)-carboxylic chloride.

Examples of compounds having the formula (IV), i.e. glycols, are butanediol-1,4, penetanediol--1,5,pentanediol-1,4,hexanediol-1,6,octanediol-1,8,2,2-dimethylpropanediol-1,3, 2,2-diethyl-propanediol-1,3, 2-methyl-2-butyl-propanediol-1,3, 2,2-dimethylhexanediol-1,3 or 2,5-dimethylpentanediol-1,3.

Particularly valuable dyes are obtained when starting from quinophthalone-5(6)-carboxylic halides, 8'-chloroquinophthalone-5(6)-carboxylic halides or 6'-methylquinophthalone-5(6)-carboxylic halides and pentanediols or hexanediols.

Reaction of the components (III) and (IV) with one another is advantageously carried out by heating a quinophthalone carboxylic halide having the formula III with an equivalent amount or an excess of a glycol having the formula IV in an inert solvent until elimination of hydrogen halide has ceased. Mixtures of components (III) and/or (IV) may be used instead of the individual compounds.

Examples of suitable inert solvents are toluene, xylene, chlorobenzene, dichlorobenzene, trichlorobenzene, nitrobenzene, naphthalene or diphenyl ether. An excess of the glycol to be reacted may be used as solvent instead of an inert solvent.

The reaction temperatures may be chosen within wide limits, for example they may be from 100° to 250° C., preferably from 100° to 180° C.

On cooling, the reaction products usually crystallize out and may be isolated for example by suction filtration. Precipitation of the dyes may be completed by adding for example methanol or cyclohexane. The reaction mixture may also be freed from solvent by steam distillation so that an aqueous suspension of the reaction product is obtained which can be suction filtered.

The new dyes are yellow. They are eminently suitable for dyeing and/or printing polyester textile material and synthetic polyamide textile material and they have excellent light fastness and thermal fastness.

The invention is illustrated by the following examples. The parts specified in the examples are parts by weight.

EXAMPLE 1

33.6 parts of quinophthalone-5(6)-carboxylic chloride, 20 parts of pentanediol-1,5 and 300 parts of anhydrous chlorobenzene are boiled under reflux for four hours. The reaction mixture is allowed to cool and the deposited dye is suction filtered, washed with methanol, and dried. 38.5 parts of quinophthalone-5(6-carboxylic omega-oxypentyl ester is obtained in the form of yellow crystals having a melting point of 219° to 221° C. The dye dyes linear polyester and polyamide fibers and cloth clear greenish yellow shades having very good light fastness and fastness to heat setting.

When quinophthalone-5(6)-carboxylic chloride is reacted analogously with the glycols set out in table 1, other yellow dyes can be prepared having similar tinctorial properties. E=Example No.

TABLE 1

| E | Glycol | Melting point in °C. of the ester |
|---|---|---|
| 2 | HOCH$_2$CH$_2$CH$_2$CH$_2$OH | 220 to 221. |
| 3 | HOCH$_2$CH$_2$CH$_2$CHOHCH$_3$ | 215 to 218. |
| 4 | HOCH$_2$CH$_2$CH$_2$CH$_2$CH$_2$OH | 278 to 279. |
| 5 | HOCH$_2$CH$_2$CH$_2$CH$_2$CH$_2$CH$_2$CH$_2$CH$_2$OH | 217 to 218. |
| 6 | HOCH$_2$C(CH$_3$)(C$_3$H$_7$)CH$_2$OH | 209 to 210. |
| 7 | HOCH$_2$C(CH$_3$)(CH$_3$)CHOHCH(CH$_3$)(CH$_3$) | 212 to 214. |
| 8 | HOCH$_2$CHCH(C$_2$H$_5$)OHCH$_2$CH$_2$CH$_3$ | 214 to 216. |

EXAMPLE 9

33.6 parts of quinophthalone-5(6)-carboxylic chloride, 10 parts of pentanediol-1,5, 10 parts of hexanediol-1,6 and 300 parts of anhydrous dichlorobenzene are boiled under reflux for ninety minutes. The dichlorobenzene is then distilled off with steam. The dye is isolated from the resultant aqueous dye suspension by suction filtration, washed with water and dried. 40 parts of a yellow powder is obtained which consists of a mixture of the omega-oxypentyl and omega-oxyhexyl esters of quinophthalone-5(6)-carboxylic acid and which gives dyeings having excellent light fastness and fastness to heat setting on polyesters and polyamides.

EXAMPLE 10

35 parts of 6'-methylquinophthalone-5(6)-carboxylic chloride, 20 parts of pentanediol-1,5 and 250 parts of anhydrous trichlorobenzene are stirred for one hour at 140° C. and for another hour at 160° C. 100 parts of methanol is added during cooling. The deposited yellow crystals are suction filtered at room temperature, washed with methanol and dried. 37 parts of the omega-oxypentyl ester of 6' methylquinophthalone-5(6)-carboxylic acid is obtained which has a melting point of 234° to 237° C. The dye dyes polyesters clear yellow shades having good light fastness and excellent fastness to heat setting. Other esters of 6'-methylquinophthalone-5(6)-carboxylic acid having similar tinctorial properties are obtained with the glycols specified in the following table 2:

TABLE 2

| E | Glycol | Melting point in °C. of the ester |
|---|---|---|
| 11 | HOCH₂CH₂CH₂CH₂CH₂CH₂OH | 226 to 227. |
| 12 | HOCH₂CH₂CH₂CH₂CH₂CH₂CH₂CH₂OH | 231 to 232. |
| 13 | HOCH₂CHCHOHCH₂CH₂CH₃ <br>         | <br>        C₂H₅ | 230 to 232. |

EXAMPLE 14

16.8 parts of quinophthalone-5(6)-carboxylic chloride, 17.5 parts of 6'-methylquinophthalone-5(6)-carboxylic chloride, 20 parts of pentanediol-1,5 and 300 parts of anhydrous chlorobenzene are boiled under reflux for three hours and then allowed to cool. The deposited dye is suction filtered and freed from solvent by steam distillation. After the product has been dried, 36.5 parts of a mixture of the omega-oxypentyl esters of quinophthalone-5(6)-carboxylic acid and 6'-methylquinophthalone-5(6)-carboxylic acid is obtained. The clear yellow dyeings achieved with this dye on linear polyester or linear polyamide threads and cloth have high fastness to light and heat setting.

EXAMPLE 15

Thirty-seven parts of 8'-chloroquinophthalone-5(6)-carboxylic chloride, 20 parts of pentanediol-1,5 and 400 parts of an anhydrous chlorobenzene are boiled under reflux for four hours and allowed to cool while stirring. The dye is suction filtered, washed with methanol and dried. 41 parts of 8'-chloroquinophthalone-5(6)-carboxylic omega-oxypentyl ester is obtained having a melting point of 214° to 215° C. The greenish yellow dyeings of this dye on polyesters have outstanding fastness to light and heat setting.

EXAMPLE 16

By replacing the pentanediol-1,5 in example 15 by 25 parts of hexanediol-1,6 and otherwise following the procedure of Example 15, 41.5 parts of 8'-chloroquinophthalone-5(6)-carboxylic omega oxyhexyl ester is obtained having a melting point of 238° to 240° C. The dyeings on polyesters have the same properties as the dye of example 15.

Dyes having the formula:

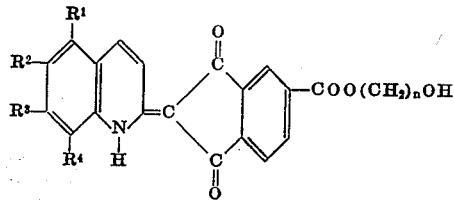

in which R¹, R², R³, R⁴ and n have the meanings given in Table 3 and which give greenish yellow dyeings having excellent fastness to light and heat setting are obtained by analogous reaction of substituted quinophthalone-5(6)-carboxylic chlorides with pentanediol-1, 5 or hexanediol-1,6.
E = Example No.; m.pt. = melting point in °C:

TABLE 3

| E | R¹ | R² | R³ | R⁴ | n | M. pt |
|---|---|---|---|---|---|---|
| 17 | H | Cl | H | H | 5 | 275–277 |
| 18 | H | Cl | H | H | 6 | 287–290 |
| 19 | H | H | Cl | H | 5 | 212–215 |
| 20 | H | H | Cl | H | 6 | 223–224 |
| 21 | Cl | H | H | CH₃ | 5 | 230–232 |
| 22 | Cl | H | H | CH₃ | 6 | 218–220 |
| 23 | H | Cl | H | CH₃ | 5 | 226–227 |
| 24 | H | Cl | H | CH₃ | 6 | 260–263 |
| 25 | H | CH₃ | Cl | H | 5 | 232–235 |
| 26 | H | CH₃ | Cl | H | 6 | 230–232 |
| 27 | Cl | CH₃ | H | Cl | 5 | 275–278 |
| 28 | Cl | H | H | Cl | 6 | 244–247 |

We claim:
1. A dye having the formula

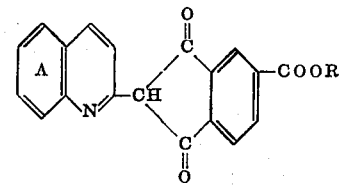

in which:
R is hydroxyalkyl of four to eight carbon atoms; and the ring A bears up to three substituents selected from the group consisting of chlorine, bromine, methyl, ethyl, methoxy and ethoxy.

2. A dye as claimed in claim 1 wherein the ring A bears one to two substituents selected from the group consisting of chlorine and methyl.

3. A dye as claimed in claim 1 wherein the ring A is unsubstituted so as to designate the hydroxyalkyl ester of quinophthalone-5(6)-carboxylic acid.

4. A dye as claimed in claim 1 wherein the ring A bears a single methyl substituent to designate the hydroxyalkyl ester of 6'-methylquinophthalone-5(6)-carboxylic acid.

5. A dye as claimed in claim 1 wherein the ring A bears a single chlorine substituent to designate the hydroxyalkyl ester of 8'-chloroquinophthanlone-5(6)-carboxylic acid.

6. A dye as claimed in claim 1 wherein R is the hydroxyalkyl radical of the formula –(CH₂)ₙOH in which n is one of the integers 5 and 6.

7. A dye having the formula

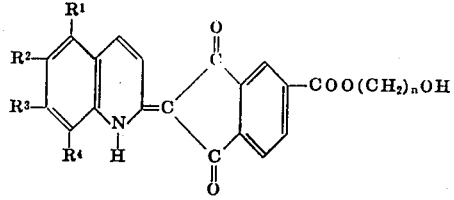

in which:
R¹ and R³ represent hydrogen or chlorine; R² and R⁴ represent hydrogen, chlorine or methyl; and n is one of the integers 5 and 6, with the proviso that R¹ to R⁴ represent not more than two chlorine atoms and not more than one methyl substituent.

* * * * *